United States Patent [19]

Hipp et al.

[11] 4,207,572

[45] Jun. 10, 1980

[54] SKY WAVE DF ANTENNA SYSTEM

[75] Inventors: Jackie E. Hipp; Douglas N. Travers; Terence C. Green; William M. Sherrill; Richard L. Johnson, all of Bexar County, Tex.

[73] Assignee: Southwest Research Institute, San Antonio, Tex.

[21] Appl. No.: 845,282

[22] Filed: Oct. 25, 1977

[51] Int. Cl.² .............................................. G01S 3/06
[52] U.S. Cl. ............................. 343/113 R; 343/118; 343/120
[58] Field of Search .................. 343/113 R, 118, 120, 343/123, 800

[56] References Cited

U.S. PATENT DOCUMENTS

| 2,413,981 | 1/1947 | Luck | 343/120 |
|---|---|---|---|
| 3,093,827 | 6/1963 | Travers | 343/123 |
| 3,329,954 | 4/1967 | Travers | 343/123 |
| 3,490,024 | 1/1970 | Sherrill et al. | 343/113 R |
| 3,795,000 | 2/1974 | Bell, Jr. et al. | 343/113 R |
| 3,824,596 | 7/1974 | Guion et al. | 343/113 R |
| 3,939,477 | 2/1976 | Green et al. | 343/113 R |

OTHER PUBLICATIONS

*IRE Transactions on Antennas and Propagation*, "The Crossed-Spaced-Loop Direction Finder", by G. Evans, Nov. 1962, pp. 686-691.

*Primary Examiner*—Maynard R. Wilbur
*Assistant Examiner*—Richard E. Berger
*Attorney, Agent, or Firm*—Donald Gunn

[57] ABSTRACT

A sky wave DF antenna system is disclosed. It is able to respond to an incoming transmitted signal and define the direction of the transmitter. It utilizes six or more simple loops connected and arranged to form a spaced loop antenna system which indicates the incoming direction of the transmitted signal without regard to the polarization or the elevational angle of the sky wave.

36 Claims, 4 Drawing Figures

SKY WAVE DF ANTENNA SYSTEM

BACKGROUND OF THE DISCLOSURE

Direction finding systems are known in the art. They have included the spaced loop direction finding system described in 1921 by Eckersley. In 1935, Eckersley and Marconi provided a precision spaced loop DF system which rotated. Subsequently, more sophisticated systems were provided, as exemplified by Travers U.S. Pat. No. 3,093,827. This yielded a more compact spinning spaced loop system. Evans at page 686–691, November, 1962, in the *IRE Transactions on Antennas and Propagation*, disclosed a type of DF antenna system utilizing two fixed spaced loops crossing at forty-five degrees (45°). Subsequently, Travers disclosed in U.S. Pat. No. 3,329,954 the use of four fixed spaced loops crossing at forty-five degree (45°) intervals. The Evans and Travers fixed spaced loop systems were designed to provide accurate azimuth angle of arrival for incoming ground wave signals. However, their direction finding performance is degraded for sky wave signals having significant elevation angles with horizontally polarized electric field components. The present invention is an apparatus that provides accurate azimuth and elevation measurements on the incident signals, both for ground waves and also for multipolarized sky waves independent of elevation angle.

BRIEF DESCRIPTION OF THE PREFERRED EMBODIMENT

The present invention is a fixed, crossed, spaced loop antenna array that yields unambiguous DF output for incident sky wave and ground wave propagation. In the preferred embodiment, it utilizes four coaxial spaced loops with horizontal axes intersecting at their midpoints and arranged at forty-five degree (45°) intervals. The output signals from the four spaced loop antennas are isolated and individually processed. The processing of these signals provides a DF bearing that is independent of signal elevation and/or polarization. A pair of simple loop antennas with horizontal axes intersecting at ninety degrees (90°) form two additional sets of signals which are used to resolve ambiguities in the DF bearing. In the preferred embodiment, each spaced loop signal is provided by a pair of coaxial simple loops connected together to thereby define a spaced loop antenna signal. The horizontal axes of the two simple loop pairs intersect at right angles at their geometrical centers which are located on a vertical line passing through the geometrical center of the array of coaxial spaced loops.

DETAILED DESCRIPTION OF THE PREFERRED EMBODIMENT

Figure 1:
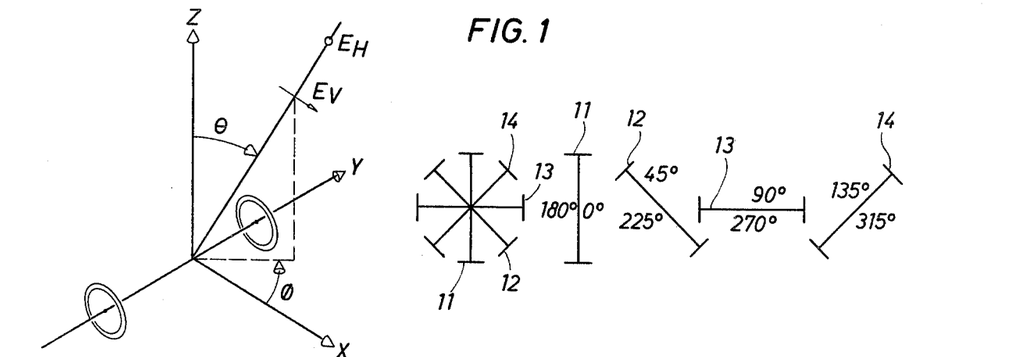
FIG. 1 is a three dimensional reference for the present invention.

FIG. 1 of the drawings sets forth certain specific definitions for the three dimensional system herein disclosed. Certain references must be defined. The references required for the present system are shown in FIG. 1 of the drawings. There, it will be observed that a point of origin of an XYZ coordinate system locates on the Y axis a pair of spaced coaxial loops. A transmitter source is located at some location in space, and a signal from it travels along a path to the origin. A received signal from the transmitter source arrives at some azimuth angle and some angle of elevation. In this disclosure, the azimuth angle is defined utilizing a conventional mathematical coordinate system. The azimuth angle rotates in a right hand sense about the vertical axis Z and is represented by the symbol $\phi$ having a value of zero to 360°. Maximum elevation angles are limited, of course, to ninety degrees (90°) which is vertical or along the Z axis from the origin. The transmitter and the sky wave signal propagated through the ionosphere provides a signal which is presumed to have both vertical and horizontal electric field components, the electric field being represented by E and subscripts identifying the polarized horizontal and vertical components.

The preferred embodiment of the spaced loop antenna array is the "eight loop" configuration shown symbolically in FIG. 1 comprising four spaced loops 11, 12, 13 and 14 having horizontal axes crossing in forty-five degree (45°) intervals at their midpoints.

Figure 2:
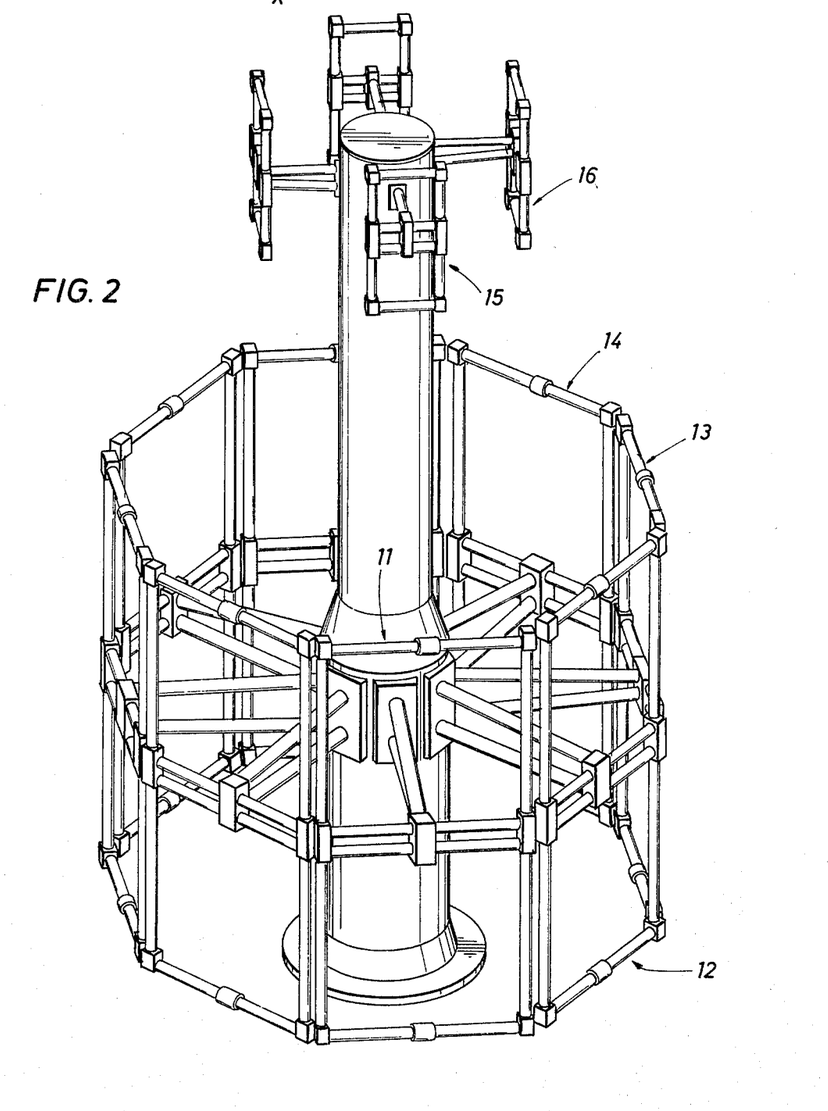
FIG. 2 shows the preferred embodiment of the antenna system.

FIG. 2 is an isometric view of the sky wave DF array in its preferred arrangement on a mast. The individual spaced loops labeled 11, 12, 13 and 14 correspond to the similarly labeled elements shown symbolically in FIG. 1. The placement and mechanical construction of the eight loop array is described in detail by the Travers U.S. Pat. No. 3,329,954. However, the internal electrical connections of the present invention differ from the reference in that the signal outputs from the four spaced loops of the present invention are four separate, isolated output signals. The simple loop arrays 15 and 16 provide additional signals for synthesizing a multipolarization omnidirectional antenna, for resolving ambiguous bearings calculated from the spaced loop data, and for determining the elevation angle of the incident skywave signal.

Figure 3:
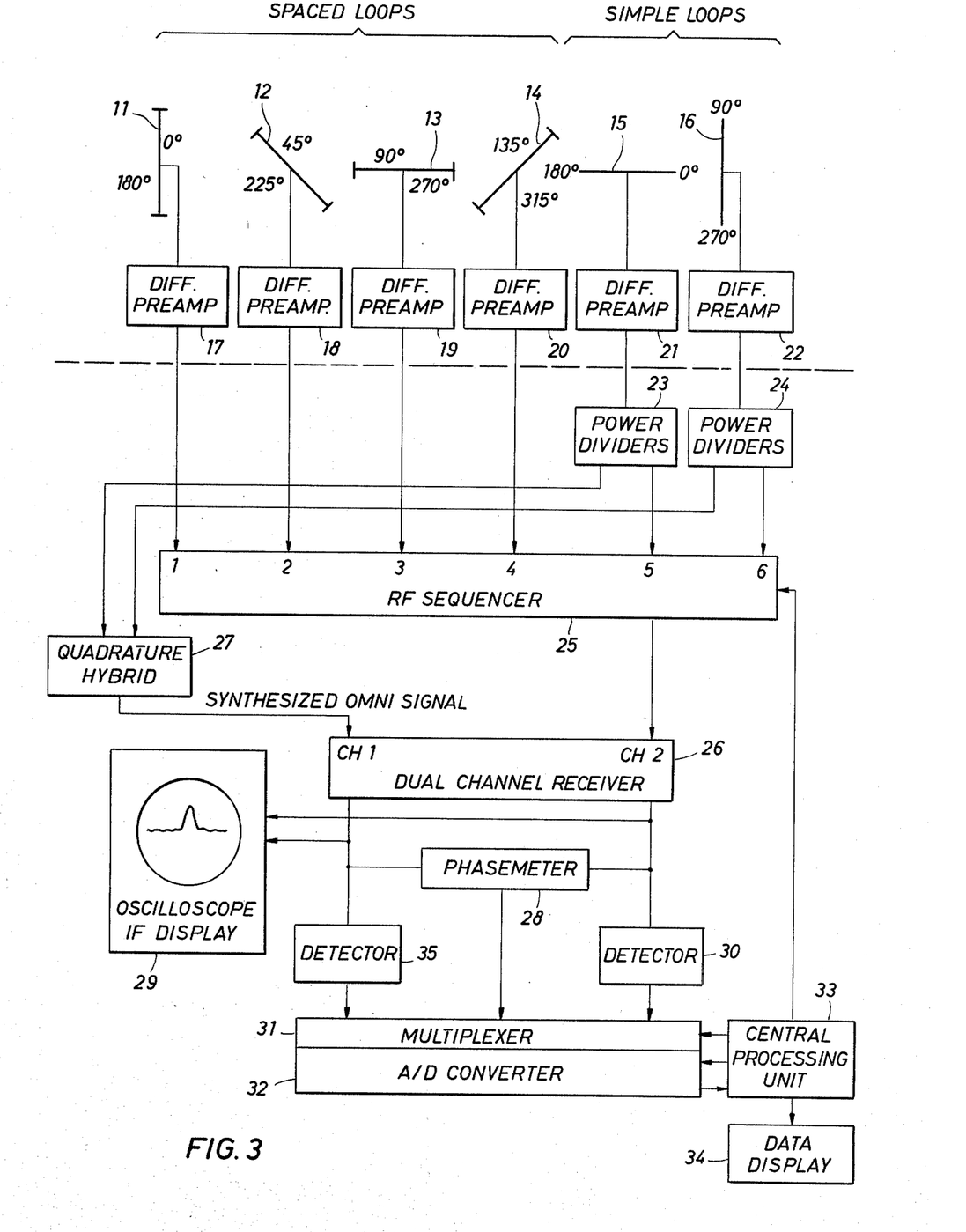
FIG. 3 is a block diagram schematic of the DF antennas system of the present invention.

Utilizing the definitions made above, attention is next directed to FIG. 3 of the drawings. In FIG. 3, the antenna system defined by several simple and spaced loops will be described. The remainder of FIG. 3 will be described after a discussion of the theory of operation of the apparatus. The nature and orientation of the several loops will be given first.

The numeral 10 thus identifies all of the apparatus shown in FIG. 3. The several antennas are numbered 11-16 in FIG. 3 and represent the correspondingly labeled antenna shown in FIG. 2. The numeral 11 identifies the first of four coaxial spaced loops having intersecting horizontal axes. The antenna 11 is connected to a differential preamplifier 17. The numeral 12 identifies an antenna which is identical to the antenna 11 and differs only in its location. It has its own dedicated preamp 18. In like manner, the numerals 13 and 14 identify additional coaxial spaced loops with respective preamps 19 and 20. Antennas 11, 12, 13 and 14 are all collectively arranged and located with horizontal axes that intersect at their midpoints and are arranged at forty-five degree (45°) intervals around a circle. The numeral 15 identifies a simple loop antenna. It is arranged at ninety degrees (90°) azimuth relative to a second simple loop antenna 16. The simple loops 15 and 16 are provided with their own preamps 21 and 22.

The two signals from the simple loop preamplifiers 21 and 22 are each input to power dividers 23 and 24, respectively. One output of each power divider is connected to the RF sequencer 25 to provide separate, isolated, simple loop signals to the receiver 26. The second output of each power divider is connected to a quadrature hybrid 27 to produce a synthesized omnidirectional, multipolarization signal. This serves as a reference signal required for measurement of the amplitude and phase parameters necessary for computation of the azimuth and elevation angles of arrival.

Equation (1) gives the spaced loop output voltage in phasor form.

$$V_a = -E_v \sin\theta \sin 2\phi + E_h e^{j\phi_h} \sin 2\theta \sin^2\phi \qquad (1)$$

where
- $E_v$ = The relative amplitude of the vertical electric field component of the received signal.
- $E_h$ = The relative amplitude of the horizontal electric field component of the received signal.
- $\phi$ = Azimuth (with respect to the X-axis) of the signal source.
- $\theta$ = Angle of incidence (90° − elevation angle)
- $\phi_h$ = the phase of the horizontal electric field component with respect to the vertical electric field component.
- $j = (-1)^{\frac{1}{2}}$ The relationship given in Equation (1) is for the output voltage from the coaxial spaced loop antenna 11 having an interferometer null plane in the XZ plane passing through 0° and 180° azimuth directions. The voltage output from a spaced loop oriented towards some azimuth $\alpha$ other than zero degrees (0°) is described by Equation (2), this equation representing a more general case while Equation (1) represents a specialized case.

$$V_a(\alpha) = -E_v \sin\theta \sin 2(\phi - \alpha) \qquad (2)$$
$$+ E_h e^{j\phi_h} \sin 2\theta \sin^2(\phi - \alpha)$$

As will be observed, the parameter of interest is the relative azimuth angle $\alpha$ in Equation (2). The coefficients of the azimuthal variables in Equation (2) can be simplified by redefinition. While arbitrary coefficients are assigned, certain choices in the definitions are made to conform the development stated hereinafter to obtain certain physically significant results. The following definitions are thus made.

$$C \triangleq E_v \sin\theta \qquad (3)$$

$$A_o \triangleq \frac{E_h e^{j\phi_h} \sin 2\theta}{2} \qquad (4)$$

Substituting the coefficients defined in Equations (3) and (4) into Equation (2), Equation (5) is defined.

$$V_a(\alpha) = -C \sin 2(\phi - \alpha) + 2A_o \sin^2(\phi - \alpha) \qquad (5)$$

On reviewing all of the terms of Equation (5), it will be noted that the spaced loop antenna azimuthal displacement angle $\alpha$ is the only factor on the right side of the equation that can be controlled at the antenna. It is advantageous to rewrite Equation (5) and separate all functions which are dependent on this angle. The equation can be rewritten by trigonometric expansion of the functions of Equation (5) to thereby obtain Equation (6).

$$V_a(\alpha) = A_o + (-C \sin 2\phi - A_o \cos 2\phi) \cos 2\alpha \qquad (6)$$
$$+ (-A_o \sin 2\phi + C \cos 2\phi) \sin 2\alpha$$

Equation (6) is useful in the form given. However, it is even more useful by defining certain coefficients. The coefficients of the spaced loop antenna azimuthal orientation angle variables are thus relabeled by labels which are convenient as will be understood hereinafter. They include the following:

$$\begin{bmatrix} A_2 \\ B_2 \end{bmatrix} \triangleq \begin{bmatrix} -C & -A_o \\ -A_o & C \end{bmatrix} \begin{bmatrix} \sin 2\phi \\ \cos 2\phi \end{bmatrix} \qquad (7)$$

Rewriting Equation (6) utilizing the definitions from Equation (7), one readily obtains Equation (8).

$$V_a(\alpha) = A_o + A_2 \cos 2\alpha + B_2 \sin 2\alpha \qquad (8)$$

Equation (8) has the form of a conventional Fourier series expression for the spaced loop antenna output voltage. The three coefficients can be represented by the following definitions:
- $A_o$ = orientation independent coefficient
- $A_2$ = Cosine coefficient for the second harmonic in spaced loop antenna orientation
- $B_2$ = Sine coefficient for the second harmonic in spaced loop antenna orientation.

Equation (8) is a general equation relating the measurable spaced loop antenna output signal $V_a$ to the azimuth orientation angle $\alpha$ of the spaced loop. A minimum of three measured values of $V_a$ collected at non-collinear values of $\alpha$ are sufficient to calculate the coefficients $A_o$, $A_2$ and $B_2$. Consequently, in an antenna system utilizing three spaced loops with azimuth orientations $\alpha_1$, $\alpha_2$ and $\alpha_3$ the measured phasor voltages must satisfy the following set of equations:

$$\begin{bmatrix} V_a(\alpha_1) \\ V_a(\alpha_2) \\ V_a(\alpha_3) \end{bmatrix} = \begin{bmatrix} 1 & \cos 2\alpha_1 & \sin 2\alpha_1 \\ 1 & \cos 2\alpha_2 & \sin 2\alpha_2 \\ 1 & \cos 2\alpha_3 & \sin 2\alpha_3 \end{bmatrix} \begin{bmatrix} A_o \\ A_2 \\ B_2 \end{bmatrix}$$

An inversion of this matrix equation provides a solution for the coefficients from any three spaced loop output voltages.

$$\begin{bmatrix} A_o \\ A_2 \\ B_2 \end{bmatrix} = \begin{bmatrix} 1 & \cos 2\alpha_1 & \sin 2\alpha_1 \\ 1 & \cos 2\alpha_2 & \sin 2\alpha_2 \\ 1 & \cos 2\alpha_3 & \sin 2\alpha_3 \end{bmatrix}^{-1} \begin{bmatrix} V_a(\alpha_1) \\ V_a(\alpha_2) \\ V_a(\alpha_3) \end{bmatrix}$$

In antenna systems utilizing more than three spaced loops, additional measurements are provided beyond the minimum number required to calculate the three Fourier coefficients. If properly utilized, the additional information resulting from the added spaced loop increases the statistical reliability of the calculated bearing by permitting implicit averaging of the various values of each coefficient resulting from all combinations of three antennas at a time. For example, in the preferred embodiment of this invention, four spaced loop antennas are employed to calculate the three coefficients. As shown above, any one of four possible combinations of three of the four antennas can be utilized to calculate the three coefficients. However, the expression for each of the three coefficients utilizing four antennas is exactly the expression that would result from averaging the four corresponding expressions from all combinations of antennas taken three at a time. A further advantage in utilizing more than three spaced loops is that the additional measurements provide sufficient information to check the measurement consistency. For example, the disagreement between two or more calculated values of any one coefficient provides a direct measure of measurement consistency. As will be understood, redundancy is not essential, but it is highly desirable.

If three or more spaced loops are equally separated in azimuth from zero degrees (0°) to one hundred eighty degrees (180°), standard expressions for Fourier series coefficients provide an efficient alternative method to calculate $A_o$, $A_2$ and $B_2$. Fourier series expressions provide an effective utilization of all the measured data, providing implicitly averaged values of the three desired coefficients. Furthermore, the calculated values of higher order coefficients provide an indication of measurement consistency, since these values are ideally zero according to Equation (8). In the preferred embodiment of this invention, the algebraic expressions for the coefficients $A_o$, $A_2$ and $B_2$ are identically the standard expressions for Fourier series coefficients obtained from four equally spaced measurements.

With calculated values for $A_o$, $A_2$ and $B_2$, the transcendental Equation (8) may be solved for four values of orientation angle that produce voltage minima. Conversely, the calculated values of $A_o$, $A_2$ and $B_2$ may be used to solve the system equations given in Equation (7) and determine four values of target azimuth $\phi$. The set of four ambiguous values of calculated azimuth are identical for either of the two methods mentioned above. In the preferred embodiment of this invention, four spaced loop antennas (each displaced forty-five degrees (45°) in azimuth from the adjacent antenna) are utilized to calculate the Fourier coefficients, and the set of system equations given in Equation (7) are solved to provide the four ambiguous spaced loop bearings. This is accomplished by the procedure explained in the following paragraphs.

Referring to FIG. 3 of the drawings, the antenna loops 11, 12, 13 and 14 are set at forty-five degree (45°) intervals. Applying Equation (8) to the four antennas, taking into account their relative forty-five degree (45°) crossing and noting that Equation (8) includes trigonometric functions of the double angles, the trigonometric functions become either zero or one. Equations (9) thus necessarily follow for the four antennas.

$$V_{11} = A_o + A_2$$
$$V_{12} = A_o + B_2$$
$$V_{13} = A_o - A_2$$
$$V_{14} = A_o - B_2 \quad (9)$$

Utilizing the equations given at (9), the values of the three coefficients can be readily obtained as given by the Equations (10).

$$A_o = \tfrac{1}{4}(V_{11} + V_{12} + V_{13} + V_{14})$$
$$A_2 = \tfrac{1}{2}(V_{11} - V_{13})$$
$$B_2 = \tfrac{1}{2}(V_{12} - V_{14}) \quad (10)$$

With the calculated values of $A_o$, $A_2$ and $B_2$, Equation (8) may be utilized to generate the pattern of a synthesized spinning spaced loop. The locations of the four resulting pattern nulls represent four possible values of target azimuth. One pair of pattern nulls, separated by 180°, represents the two spaced loop orientations at which the individual simple loops are each producing a minimum amplitude (i.e., a null) output voltage. The locations of the simple loop nulls are sensitive to signal polarization and elevation and are consequently not reliable for indication of target azimuth. The second pair of pattern nulls, again separated by 180°, are the interferometer nulls of the spaced loop antenna and result from the differential connection of the two simple loop antennas. The interferometer nulls are independent of signal polarization and elevation and, therefore, provide the basis for a reliable indication of target azimuth.

As an alternative to explicit synthesis of a spinning spaced loop, the target azimuth $\phi$ may be calculated directly by first determining the value of C and then inverting Equation (7) to calculate the values of $\sin 2\phi$ and $\cos 2\phi$. This process, described below, is computationally more efficient than synthesizing the spinning spaced loop pattern but produces identically the same two pairs of possible target azimuths.

To produce an expression for the coefficient C in terms of the calculated values resulting from Equations (10), Equations (7) are combined as shown to obtain Equation (11).

$$A_2^2 = C^2 \sin^2 2\phi + A_o^2 \cos^2 2\phi \quad (11)$$
$$+ 2A_o C \sin 2\phi \cos 2\phi$$
$$B_2^2 = C^2 \cos^2 2\phi + A_o^2 \sin^2 2\phi$$
$$- 2A_o C \sin 2\phi \cos 2\phi$$
$$A_2^2 + B_2^2 = C^2 + A_o^2$$

Rearranging terms, the value of C is given by Equation (12).

$$C = \pm(A_2^2 + B_2^2 - A_o^2)^{\tfrac{1}{2}} \quad (12)$$

Returning now to Equation (7), it will be observed that the value of every term there is known other than the trigonometric functions, and they can be solved in the relationship given by Equation (13):

$$\begin{bmatrix} \sin 2\phi \\ \cos 2\phi \end{bmatrix} = \frac{1}{-(C^2 + A_o^2)} \begin{bmatrix} C & A_o \\ A_o & -C \end{bmatrix} \begin{bmatrix} A_2 \\ B_2 \end{bmatrix} \quad (13)$$

The concluding step utilizes the two calculated values of the trigonometric functions of Equation (13) to solve for target bearing. Target bearing is thus stated in Equation (14).

$$\phi = \tfrac{1}{2} \tan^{-1} \frac{\sin 2\phi}{\cos 2\phi} + n \times 180° \quad n = 0,1 \tag{14}$$

On review of Equations (12), (13) and (14), it will be noted that there are four solutions (ambiguities) in the answer for $\phi$, the azimuth angle of arrival. The fourfold ambiguity is both a result of the sign ambiguity associated with the calculation of the parameter C by use of Equation (12) and the one hundred eighty degree (180°) ambiguity resulting from n in Equation (14). There are two possible calculated values of C, differing in sign only, and they result in two possible pairs of values for the trigonometric functions given in Equation (13). One choice of sign produces the simple loop null pair, while the other choice of sign produces the interferometer null pair. In addition, a single combination of calculated values for the trigonometric functions results in two equally valid values for target bearing, the two values differing from one another by one hundred eighty degrees (180°).

To obtain the azimuth angle of arrival for the received signal, an unambiguous estimate of target bearing must be obtained to select the correct bearing value from the four ambiguous values. The preferred embodiment of ambiguity resolution is described as follows. Simple loop antennas 15 and 16 are incorporated to provide additional voltage measurements required to eliminate the ambiguity. (Alternatively, the simple loop signals may be derived from the spaced loop antennas by appropriate internal switching.) The spaced loop antenna system can be considered to be furnishing two simple loop null DF solutions and also two interferometer null DF solutions. It is, therefore, more reliable to first eliminate the two simple loop null solutions, and to then resolve the remaining 180° ambiguity of the interferometer nulls.

The principle of pattern multiplication is presented and discussed by Kraus in his textbook, *Antennas*. The principle of pattern multiplication allows the output voltage $V_L$ of a simple loop antenna to be expressed as the output voltage $V_a$ from a coaxial spaced loop antenna of similarly oriented loop antennas divided by the array factor for the spaced loop antenna. This relation is expressed in terms of the spaced loop orientation $\alpha$ by the following equation:

$$V_L(\alpha) = \frac{V_a(\alpha)}{j\beta d \sin\theta \sin(\phi - \alpha)}$$

where
$\beta = 2\pi/$(signal wavelength)
d = spatial separation of the spaced loops.

Referring to Equation (5) which provides the numerator of the right side, Equation (15) can be obtained.

$$V_L(\alpha) = \frac{2[-C\cos(\phi - \alpha) + A_o \sin(\phi - \alpha)]}{j\beta d \sin\theta} \tag{15}$$

On review of Equation (15), it will be seen that the output signals from the simple loops in the respective planes at 0°–180° (antenna 15) and 90°–270° (antenna 16) are given by Equations (16) and (17).

$$V_{15} = V_L(o) = \frac{2}{j\beta d \sin\theta}(-C\cos\phi + A_o \sin\phi) \tag{16}$$

$$V_{16} = V_L(90) = \frac{2}{j\beta d \sin\theta}(-C\sin\phi - A_o \cos\phi) \tag{17}$$

The ratio of the output voltages at the two orthogonally oriented simple loops 15 and 16 defines an expression for the location of a simple loop null. This is given in Equation (18).

$$\alpha_n = \tan^{-1} \frac{V_{15}}{-V_{16}} \tag{18}$$

With the calculated value of the simple loop null azimuth, two of the four spaced loop bearings calculated by Equations (13) and (14) may be identified as simple loop nulls. This eliminates them from possible indication of the target bearing in azimuth and leaves only the pair of interferometer nulls. Further, the identified simple loop nulls correspond to a specific choice of sign for the parameter C which was ambiguously defined in Equation (12). As a consequence, the proper sign for the parameter C is thus established, and Equations (16) and (17) may then be inverted to provide a nonambiguous approximation of the target bearing angle. Equations (16) and (17) can be restated in matrix form to emphasize the dependence on sine and cosine of the target bearing angle. Equation (19) is:

$$\begin{bmatrix} V_{15} \\ V_{16} \end{bmatrix} = \frac{2}{j\beta d \sin\theta} \begin{bmatrix} A_o & -C \\ -C & -A_o \end{bmatrix} \begin{bmatrix} \sin\phi \\ \cos\phi \end{bmatrix} \tag{19}$$

The inverse of Equation (19) is given by Equation (20):

$$\frac{2}{\beta d \sin\theta} \begin{bmatrix} \sin\phi \\ \cos\phi \end{bmatrix} = \frac{j}{(-A_o^2 - C^2)} \begin{bmatrix} -A_o & C \\ C & A_o \end{bmatrix} \begin{bmatrix} V_{15} \\ V_{16} \end{bmatrix} \tag{20}$$

All terms on the right side of Equation (20) are known, and accordingly, the unambiguous target bearing estimate can be calculated as given by Equation (21).

$$\phi = \tan^{-1} \frac{V_1}{V_2} \tag{21}$$

where $V_1$ and $V_2$ are calculated values given in matrix form by Equation (22).

$$\begin{bmatrix} V_1 \\ V_2 \end{bmatrix} \triangleq \frac{2}{\beta d \sin\theta} \begin{bmatrix} \sin\phi \\ \cos\phi \end{bmatrix} = \frac{j}{(-A_o^2 - C^2)} \begin{bmatrix} -A_o & C \\ C & A_o \end{bmatrix} \begin{bmatrix} V_{15} \\ V_{16} \end{bmatrix} \tag{22}$$

The unambiguous approximation of target bearing angle yielded by Equations (21) and (22) allows the correct selection of the target bearing from the pair of interferometer solutions yielded by Equation (14). After the target azimuth $\phi$ is determined, the values of all terms in the second part of Equation (22) are known except $\sin\theta$. The value of $\sin\theta$ can now be determined from either of the two individual equations given in the first two parts of Equation (22).

$$\sin\theta = \frac{2\sin\phi}{\beta d\, V_1} \quad (23)$$

or $$\sin\theta = \frac{2\cos\phi}{\beta d\, V_2}$$

Because of signal noise, the most reliable calculated value of $\sin\theta$ will result from the expression having the largest numerator. Consequently, the elevation angle may be calculated as $$\text{elevation} = 90° - \theta \quad (24)$$

where $$\theta = \begin{cases} \sin^{-1}\left(\dfrac{2\sin\phi}{\beta d\, V_1}\right) & \text{if } |V_1| > |V_2| \\ \sin^{-1}\left(\dfrac{2\cos\phi}{\beta d\, V_2}\right) & \text{if } |V_2| > |V_1| \end{cases}$$

The previous discussion of ambiguity resolution was directed toward a system containing two orthogonal simple loops. A more generalized discussion of the same resolution technique with two arbitrarily oriented simple loops is now presented. By defining an angle $\gamma$ such that $\gamma = \tan^{-1}(C/A_o)$, Equation (15) may be written more compactly as Equation (25).

$$V_L(\alpha) = \frac{2(A_o^2 + C^2)^{\frac{1}{2}}}{j\beta d\,\sin\theta}\, \sin[(\phi - \alpha) - \gamma] \quad (25)$$

Obviously, the choice of orientation angle $\alpha = \alpha_n = \phi - \gamma$ is the orientation angle producing zero simple loop output voltage in Equation (25). Substituting $\alpha_n$ for $\phi - \gamma$ in Equation (25), and expanding the trigonometric function results in Equation (26).

$$V_L(\alpha) = \frac{2(A_o^2 + C^2)^{\frac{1}{2}}}{j\beta d\,\sin\theta}\,[\sin\alpha_n \cos\alpha - \cos\alpha_n \sin\alpha] \quad (26)$$

Consequently, the measured output voltages from two simple loops with horizontal axes perpendicular to $\alpha_1$ and $\alpha_2$ must satisfy the following matrix equation.

$$\begin{bmatrix} V_L(\alpha_1) \\ V_L(\alpha_2) \end{bmatrix} = \quad (27)$$

$$\frac{2(A_o^2 + C^2)^{\frac{1}{2}}}{j\beta d\,\sin\theta} \begin{bmatrix} \cos\alpha_1 & -\sin\alpha_1 \\ \cos\alpha_2 & -\sin\alpha_2 \end{bmatrix} \begin{bmatrix} \sin\alpha_n \\ \cos\alpha_n \end{bmatrix}$$

The matrix Equation (27) can be inverted to produce Equation (28) describing $\sin\alpha_n$ and $\cos\alpha_n$.

$$\begin{bmatrix} \sin\alpha_n \\ \cos\alpha_n \end{bmatrix} = \quad (28)$$

$$\frac{j\beta d\,\sin\theta}{2\Delta(A_o^2 + C^2)^{\frac{1}{2}}} \begin{bmatrix} -\sin\alpha_2 & \sin\alpha_1 \\ -\cos\alpha_2 & \cos\alpha_1 \end{bmatrix} \begin{bmatrix} V_L(\alpha_1) \\ V_L(\alpha_2) \end{bmatrix}$$

where $\Delta = \cos\alpha_2 \sin\alpha_1 - \cos\alpha_1 \sin\alpha_2$. The simple loop null orientation azimuth $\alpha_n$ may, therefore, be calculated by Equation (29).

$$\alpha_n = \tan^{-1}\left[\frac{-\sin\alpha_2\, V_L(\alpha_1) + \sin\alpha_1\, V_L(\alpha_2)}{-\cos\alpha_2\, V_L(\alpha_1) + \cos\alpha_1\, V_L(\alpha_2)}\right] \quad (29)$$

The calculated value of $\alpha_n$ may be used to eliminate two of the four ambiguous bearings calculated from the spaced loop measurements. As before, the identification of the simple loop null bearings determines the proper sign for the parameter C.

In expanded form, Equation (15) becomes $$V_L(\alpha) = \frac{2}{j\beta d\,\sin\theta}\,[-C(\cos\phi\cos\alpha + \sin\phi\sin\alpha) \quad (30)$$

$$+ A_o(\sin\phi\cos\alpha - \cos\phi\sin\alpha)]$$

$$= \frac{2}{j\beta d\,\sin\theta}\,[(-C\sin\alpha + A_o\cos\alpha)\sin\phi$$

$$+ (-C\cos\alpha - A_o\sin\alpha)\cos\phi]$$

Both measured simple loop outputs must satisfy Equation (30), thus producing Equation (31).

$$\begin{bmatrix} V_L(\alpha_1) \\ V_L(\alpha_2) \end{bmatrix} = \quad (31)$$

$$\frac{2}{j\beta d\,\sin\theta} \begin{bmatrix} (-C\sin\alpha_1 + A_o\cos\alpha_1) & (-C\cos\alpha_1 - A_o\sin\alpha_1) \\ (-C\sin\alpha_2 + A_o\cos\alpha_2) & (-C\cos\alpha_2 - A_o\sin\alpha_2) \end{bmatrix} \begin{bmatrix} \sin\phi \\ \cos\phi \end{bmatrix}$$

The inverse of Equation (31) is given by Equation (32).

$$\frac{2}{\beta d\,\sin\theta} \begin{bmatrix} \sin\phi \\ \cos\phi \end{bmatrix} = \quad (32)$$

$$\frac{j}{D} \begin{bmatrix} (-C\cos\alpha_2 - A_o\sin\alpha_2) & (C\cos\alpha_1 + A_o\sin\alpha_1) \\ (C\sin\alpha_2 - A_o\cos\alpha_2) & (-C\sin\alpha_1 + A_o\cos\alpha_1) \end{bmatrix} \begin{bmatrix} V_L(\alpha_1) \\ V_L(\alpha_2) \end{bmatrix}$$

where $$D = (-C\sin\alpha_1 + A_o\cos\alpha_1)(-C\cos\alpha_2 - A_o\sin\alpha_2)$$

$$- (-C\cos\alpha_1 - A_o\sin\alpha_1)(-C\sin\alpha_2 + A_o\cos\alpha_2)$$

All terms on the right side of Equation (32) are known, and, accordingly, the unambiguous target bearing estimate is given by Equation (21).

$$\phi = \tan^{-1}\frac{V_1}{V_2} \quad (33)$$

where $V_1$ and $V_2$ are calculated values given in matrix form by Equation (34).

$$\begin{bmatrix} v_1 \\ v_2 \end{bmatrix} \triangleq \frac{2}{\beta d\,\sin\theta} \begin{bmatrix} \sin\phi \\ \cos\phi \end{bmatrix} = \quad (34)$$

$$\frac{j}{D} \begin{bmatrix} (-C\cos\alpha_2 - A_o\sin\alpha_2) & (C\cos\alpha_1 + A_o\sin\alpha_1) \\ (C\sin\alpha_2 - A_o\cos\alpha_2) & (-C\sin\alpha_1 + A_o\cos\alpha_1) \end{bmatrix} \begin{bmatrix} V_L(\alpha_1) \\ V_L(\alpha_2) \end{bmatrix}$$

The unambiguous approximation of target bearing angle yielded by Equations (33) and (34) allows the correct selection of the target bearing from the pair of interferometer solutions yielded by Equation (14).

The expressions given in Equations (29), (33) and (34) are general expressions for bearing ambiguity resolution using two arbitrarily oriented simple loops, and reduce or simplify to Equations (18), (21) and (22) for the special case of spatially orthogonal simple loops. The expression given in Equation (24) for calculating elevation angle of the incident signal is also valid for arbitrarily oriented simple loops, provided $V_1$ and $V_2$ are calculated by Equation (34).

The previous discussion has presented techniques by which fixed spaced loop data may be processed to produce ambiguous spaced loop bearings and techniques by which fixed simple loop data may be processed to eliminate the spaced loop ambiguities and to provide a value for elevation angle of arrival. An alternate technique may be implemented whereby the signals from at least two spaced loops and a representative simple loop from each of the two spaced loops are processed to produce an unambiguous DF bearing and an elevation angle. This alternative method may be used as an independent DF technique or as a method for resolving the spaced loop ambiguities. In contrast to the previous discussion, the alternate method utilizes trigonometric functions of the bearing angle, not the double angle, and the calculations are, therefore, less precise. However, the four ambiguous solutions resulting from the sequence utilizing Equations (10), (12), (13) and (14) above can be compared to the unambiguous estimate, and the solution that is the closest to the estimate may then be chosen to represent the target bearing.

The unambiguous technique synthesizes an interferometer array of isotropic receiving antennas by using the principle of pattern multiplication. The unambiguous technique exploits the known relationship between the output signal $V_L$ from any nonisotropic antenna and the output signal $V_a$ from an array of such antennas. According to the principle of pattern multiplication, these output signals are related by the array factor $V_N$ of the array, according to the relation $$V_a = V_L \times V_N$$

where the array factor $V_N$ is a normalized far field response pattern of an array of isotropic antennas located and connected in a configuration identical to the nonisotropic antennas. In the case of a small aperture interferometer array, oriented with null toward an azimuth of 0°, the array factor $V_N$ is known to be $$V_N \triangleq V_a/V_L = j\beta d \sin\theta \sin\phi \text{ for } \beta d << 1$$

Therefore, an output signal containing separate azimuth and elevation angle information may be synthesized from an interferometer array output signal divided by the output signal from a representative antenna of the interferometer array. Specifically, this signal may be synthesized from a spaced loop array oriented toward azimuth $\alpha$, and a simple loop representative of that array, i.e., $$V_N(\alpha) = V_a(\alpha)/V_L(\alpha) \qquad (35)$$
$$= j\beta d \sin\theta \sin(\phi - \alpha)$$

In FIGS. 1, 2 and 3, signals from the spaced loop array oriented toward zero degrees (0°) azimuth and the simple loop with axis parallel to the spaced loop may be combined to yield a synthesized signal given by Equation (36).

$$V_N(0) \triangleq V_{11}/V_{15} \qquad (36)$$
$$= j\beta d \sin\theta \sin\phi$$

Likewise, signals from the spaced loop oriented toward 90° azimuth and the simple loop with axis parallel to the spaced loop may be combined by the relationship set forth in Equation (37).

$$V_N(90) \triangleq V_{13}/V_{16} \qquad (37)$$
$$= -j\beta d \sin\theta \cos\phi$$

Using Equations (36) and (37) which provide ratios of measured quantities on the left and trigonometric functions of two unknown angles on the right, it is possible to rearrange knowns and unknowns to separate the bearing angle from the equations to thereby obtain the bearing angle from Equation (38).

$$\phi = \tan^{-1}\left[\frac{-jV_N(0)}{jV_N(90)}\right] \qquad (38)$$

Furthermore, the elevation of the target may be calculated on rearranging the terms of Equations (36) and (37) to obtain Equation (39).

$$\theta = \sin^{-1}\left[\frac{1}{j\beta d}[(V_N^2(0) + V_N^2(90)]^{\frac{1}{2}}\right] \qquad (39)$$
$$\text{elevation} = 90° - \theta.$$

Equation (38) provides an unambiguous estimate of target bearing. The method has some difficulty when the target bearing is near one of the simple loop nulls. As the target bearing approaches one of the simple loop nulls, the measured output voltages of both the simple loop and the corresponding spaced loop become small, and, therefore, the noise is relatively large and dominant, and, at this juncture, the noise contamination of the signal degrades the value of the calculated quantities $V_N(0)$ or $V_N(90)$.

However, this difficulty may be overcome by utilizing the additional available orientations of the spaced loop array. For example, referring to the eight loop spaced loop array, one pair of mutually orthogonal spaced loops exists which is oriented toward 0° and 90°, and an alternate pair exists oriented toward 45° and 135°. When the target approaches the simple loop null of one spaced loop, the signal from its associated simple loop will be observed to fall below some noise related threshold value, requiring a switch to the use of the alternate pair of mutually orthogonal spaced loops.

The previous discussion of interferometer synthesis was for the special case of mutually orthogonal synthesized interferometers. A more generalized discussion of elevation and bearing calculation by means of interferometer synthesis follows. Equation (35) gives the expression for the synthesis of an interferometer from a spaced loop oriented toward azimuth $\alpha$, and a simple loop representative of that spaced loop. By expanding the trigonometric function of $\phi - \alpha$ in Equation (35), Equation (40) results.

$$V_N(\alpha) = j\beta d \sin \theta \, [\sin \phi \cos \alpha - \cos \phi \sin \alpha] \quad (40)$$

Consequently, the output voltages of two interferometers synthesized from the combination of the spaced loops oriented toward azimuths $\alpha_1$ and $\alpha_2$ and two corresponding simple loops must satisfy Equation (41).

$$\begin{bmatrix} V_N(\alpha_1) \\ V_N(\alpha_2) \end{bmatrix} = j\beta d \sin \begin{bmatrix} \cos \alpha_1 & -\sin \alpha_1 \\ \cos \alpha_2 & -\sin \alpha_2 \end{bmatrix} \begin{bmatrix} \sin \phi \\ \cos \phi \end{bmatrix} \quad (41)$$

The inverse of Equation (41) gives expressions for $\sin \phi$ and $\cos \phi$.

$$\begin{bmatrix} \sin \phi \\ \cos \phi \end{bmatrix} = \frac{1}{j\beta d \Delta \sin \theta} \begin{bmatrix} -\sin \alpha_2 & \sin \alpha_1 \\ -\cos \alpha_2 & \cos \alpha_1 \end{bmatrix} \begin{bmatrix} V_N(\alpha_1) \\ V_N(\alpha_2) \end{bmatrix} \quad (42)$$

where $$\Delta = \cos \alpha_2 \sin \alpha_1 - \cos \alpha_1 \sin \alpha_2$$

The target azimuth may therefore be calculated as $$\phi = \tan^{-1} \left[ \frac{[-\sin \alpha_2 V_N(\alpha_1) + \sin \alpha_1 V_N(\alpha_2)]/j\Delta}{[-\cos \alpha_2 V_N(\alpha_1) + \cos \alpha_1 V_N(\alpha_2)]/j\Delta} \right] \quad (43)$$

Equation (43) is a more generalized version of Equation (38) and simplifies to Equation (38) for orthogonally positioned spaced loops.

With a knowledge of target bearing, Equation (35) may be inverted to calculate the angle of incidence.

$$\theta = \sin^{-1} \left[ \frac{V_N(\alpha)}{j\beta d \sin(\phi - \alpha)} \right] \quad (44)$$

Since the value of $V_N(\alpha)$ is calculated as the ratio of measured voltages from a spaced loop and simple loop, the most reliable calculated value of target incidence will result from the pair of measurements least contaminated by noise.

$$\theta = \begin{cases} \sin^{-1} \left[ \dfrac{V_N(\alpha_1)}{j\beta d \sin(\phi - \alpha_1)} \right] & \text{if } |V_L(\alpha_1)| > |V_L(\alpha_2)| \\ \sin^{-1} \left[ \dfrac{V_N(\alpha_2)}{j\beta d \sin(\phi - \alpha_2)} \right] & \text{if } |V_L(\alpha_2)| > |V_L(\alpha_1)| \end{cases}$$

elevation $= 90° - \theta$.

The four spaced loop antennas in the preferred embodiment provide four measurements for the purpose of calculating the three coefficients $A_o$, $A_2$ and $B_2$. Depending on how the four raw measurements are utilized, different values for the three coefficients can be obtained. With reference to Equation (9), it is obvious that the coefficient $A_o$ may be calculated from either of two different sets of spaced loop voltages as given by Equations (46) and (47).

$$A_o' = \tfrac{1}{2}(V_{11} + V_{13}) \quad (46)$$

$$A_o'' = \tfrac{1}{2}(V_{12} + V_{14}) \quad (47)$$

Taking the difference between Equations (46) and (47), one can readily obtain Equation (48).

$$A_4 = \tfrac{1}{2}(V_{11} + V_{13} - V_{12} - V_{14}) \quad (48)$$

In theory, the two calculated values given by Equations (46) and (47) should be identical, and as a consequence, Equation (48) should theoretically yield zero on the right. Inconsistencies as might arise between the spaced loop signal set and the theoretical model result from typical sources such as signal noise, imperfections in preamplifiers, multipath radiation, etc. The relative value given by Equation (48) is a direct measure of the quality of the calculations. If it is small, the bearing calculations are quite reliable and accurately given.

Tests have been performed utilizing spaced loop antennas having a width of twenty inches, heighth of forty inches and depth of sixty inches. The individual spaced loop antenna patterns are created by connecting the output of the diametrically opposite simple loop antennas in parallel opposition to one another. The two simple loop antennas 15 and 16 with dimensions of 18 inches by 18 inches by 48 inches have outputs formed by connecting two diametrically opposite simple loop antennas in parallel adding.

All of the six antennas shown in FIG. 3 have been connected through low noise preamplifiers, one suitable version being the COMDEL HDR-101A.

FIG. 3 shows how the six antenna signals and the reference signal are utilized. The numeral 25 identifies an RF sequencer. It provides switched antenna signals to a receiver 26. The receiver 26 is a dual channel HF receiver, one suitable designation of receiver being a modified Racal RA-6772 model. The receiver 26 is provided with the synthesized onmi output signal continuously at one channel. This serves as an amplitude and phase reference for each of the six antenna signal outputs. The other six channels are symmetrically switched by the RF sequencer 25 and provide the second input. The receiver 26 forms two outputs. Each of the two IF signals is supplied to the amplitude detectors. The reference is provided to a detector 27. The reference signal is also supplied to a phase meter 28 to serve as a reference for the phase measurement. The reference signal is also applied to some type of monitor device such as an oscilloscope 29.

The IF signal of the antenna selected by the RF sequencer is delivered to a similar detector apparatus 30. This IF signal is also supplied to the phase meter 28. The phase meter forms an indication of the phase difference between the reference IF signal and the IF signal from the RF sequencer. The IF signal from the RF sequencer additionally is connected to the oscilloscope 29.

The detectors 35 and 30 provide inputs representative of simultaneous voltage amplitude to a multiplexer 31. The multiplexer 31 selectively feeds the amplitudes of the reference and sequenced channels and the phase measurement to an analog-to-digital converter 32. The converter 32 forms the signals into suitable digital words supplied to the computer 33. The computer 33 processes the entire set of spaced loop and simple loop amplitudes and phases to produce a value indicative of the direction to the target and outputs it to a data display 34. The computer 33 also controls the timing and sequencing of the RF sequencer 25, multiplexer 31, and analog-to-digital converter 32. The data display 34 produces a visual presentation of the computed target azimuth.

The data conversion set forth in the Equations (1) through (29) can be performed manually. However, it is more convenient to handle the data conversion through the use of a minicomputer, one suitable minicomputer being a Honeywell model DDP-516. To this end, the minicomputer has a conventional memory, central processing unit and programs stored therein for implementing the data conversions.

Figure 4:
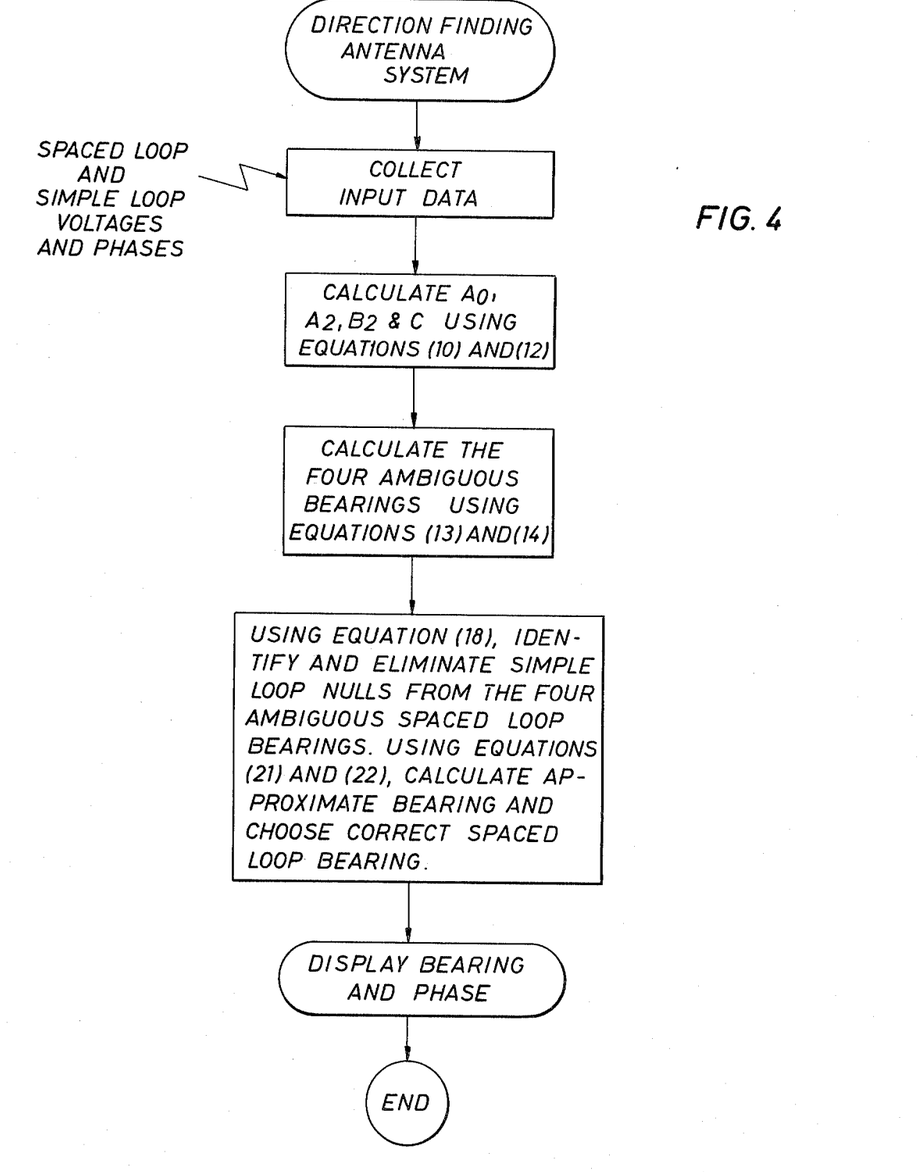
FIG. 4 is a simplified flow chart of the processing algorithm.

FIG. 4 is a simplified flow chart of the computer algorithm for processing the antenna signals to produce a calculated target bearing. Except for standard computer data acquisition and display capabilities, the algorithm is a direct implementation of Equations (10), (12), (13), (14), (18), (21), (22) and (24).

The foregoing is directed to the preferred embodiment, but the scope thereof is determined by the claims which follow.

We claim:

1. Antenna apparatus for providing the azimuth bearing of a transmitter where the incident signal from the transmitter has an angle of elevation of between 0 and 90 degrees and where the incident signal includes vertical and horizontal polarization components of any amplitude or phase, the antenna apparatus comprising:
   (a) at least three loop antenna systems having horizontal axes, at least three of which have nonparallel axes and which form spaced loop antenna output signals $V_a(\alpha)$ given by $$V_a(\alpha) = -E_v \sin\theta \sin 2(\phi - \alpha) + E_h e^{j\phi_h} \sin 2\theta \sin(\phi - \alpha)$$

where
   $E_v$ = The relative amplitude of the vertical electric field component of the received signal.
   $E_h$ = The relative amplitude of the horizontal electric field component of the received signal.
   $\phi$ = Azimuth (with respect to the X-axis) of the signal source.
   $\theta$ = Angle of incidence (90 degrees − elevation angle).
   $\alpha$ = Azimuth orientation of the perpendicular bisector of the axis of a simple loop antenna pair which forms spaced loop antenna output signals.
   $\phi_h$ = The phase of the horizontal electric field component with respect to the vertical electric field component.
   $j = (-1)^{\frac{1}{2}}$
   and which are comprised of a fixed pair of coaxially aligned simple loop antennas and wherein at least two of the said loop antenna systems are comprised of a fixed pair of coaxially aligned, simple loop antennas having nonparallel axes and forming simple loop antenna output signals; and
   (b) means provided with said antenna output signals for processing their output signals such that a nonambiguous bearing indication of the transmitter is formed.

2. The apparatus of claim 1 wherein said signal processing means includes RF sequencer means to selectively transfer the individual antenna output signals, phasemeter means for forming a signal indicating the relative phase of each antenna output signal, detector means for forming a signal indicating the relative amplitude of each antenna output signal, an analog-to-digital converter means connected to said phasemeter means and detector means to digitize the amplitude and phase values, timing means for timed controlling of said RF sequencer and said analog-to-digital converter means, computer means connected to said converter means for combining the digitized amplitude and phase data to produce values indicating bearing and elevation of the incident signal, and data display means connected to said computer means for displaying the bearing values.

3. The apparatus of claim 1 wherein four loop pairs are oriented toward azimuths 0°, 45°, 90° and 135° to form spaced loop output signals $V_a(0)$, $V_a(45)$, $V_a(90)$ and $V_a(135)$ and the required Fourier coefficients $A_0$, $A_2$ and $B_2$ and the coefficient $C$ are calculated by $$A_0 = \tfrac{1}{4}[V_a(0) + V_a(45) + V_a(90) + V_a(135)]$$

$$A_2 = \tfrac{1}{2}[V_a(0) - V_a(90)]$$

$$B_2 = \tfrac{1}{2}[V_a(45) - V_a(135)]$$

$$C = \pm(A_2^2 + B_2^2 - A_0^2)^{\frac{1}{2}}$$

4. The apparatus of claim 1 wherein each simple loop antenna pair forming a simple loop antenna output signal is parallel to a simple loop antenna pair forming a spaced loop antenna output signal.

5. The apparatus of claim 4 wherein the output signal of each simple loop antenna pair forming simple loop antenna output signals is combined with the output signal from a parallel simple loop antenna pair forming spaced loop antenna output signals to form an effective normalized interferometer array having the same spacing as the spaced loop antenna, said interferometer having a processed output signal $V_N$ which is $$V_N(\alpha) = V_a(\alpha)/V_L(\alpha)$$

$V_a(\alpha)$ = output voltage of spaced loop with horizontal axis perpendicular to azimuth $\alpha$.

$V_L(\alpha)$ = output voltage of simple loop with horizontal axis perpendicular to azimuth $\alpha$.

6. The apparatus of claim 5 wherein two effective arrays defined in claim 5 are oriented toward noncollinear azimuths $\alpha_1$ and $\alpha_2$ where the target bearing $\phi$ is given by $$\phi = \tan^{-1}\left[\frac{[-\sin\alpha_2 V_N(\alpha_1) + \sin\alpha_1 V_N(\alpha_2)]/j\Delta}{[-\cos\alpha_2 V_N(\alpha_1) + \cos\alpha_1 V_N(\alpha_2)]/j\Delta}\right]$$

where $$\Delta = \cos\alpha_2 \sin\alpha_1 - \cos\alpha_1 \sin\alpha_2$$

7. The apparatus of claim 6 wherein the elevation angle of the incident signal is given by elevation = $90° - \theta$, and $$\theta = \begin{cases} \sin^{-1}\left[\dfrac{V_N(\alpha_1)}{j\beta d \sin(\phi - \alpha_1)}\right] & \text{if } |V_N(\alpha_1)| > |V_N(\alpha_2)| \\[2mm] \sin^{-1}\left[\dfrac{V_N(\alpha_2)}{j\beta d \sin(\phi - \alpha_2)}\right] & \text{if } |V_N(\alpha_2)| > |V_N(\alpha_1)| \end{cases}$$

and $\beta = 2\pi/(\text{signal wavelength})$.

8. The apparatus of claim 5 wherein two effective arrays defined in claim 5 are spatially orthogonal.

9. The apparatus of claim 8 wherein the target bearing $\phi$ is given by $$\phi_e = \tan^{-1}\left[\frac{-jV_N(0)}{jV_N(90)}\right]$$

10. The apparatus of claim 5 wherein the elevation angle of the incident signal is given by elevation = $90° - \theta$ $$\theta = \sin^{-1}\left[\frac{1}{j\beta d}[V_N^2(0) + V_N^2(90)]^{\frac{1}{2}}\right]$$

$\beta = 2\pi/$signal wavelength
$d = $ spaced loop separation

11. The apparatus of claim 1 wherein said three pair of simple loop antennas which form spaced loop antenna output signals are oriented toward azimuths $\alpha_1$, $\alpha_2$, and $\alpha_3$ and form output voltages $V_a(\alpha_1)$, $V_a(\alpha_2)$ and $V_a(\alpha_3)$, and the Fourier coefficients $A_0$, $A_2$ and $B_2$, and the coefficient C for use in calculation of azimuth by said signal processing means are given by $$\begin{bmatrix}A_o\\A_2\\B_2\end{bmatrix} = \begin{bmatrix}1 & \cos 2\alpha_1 & \sin 2\alpha_1\\1 & \cos 2\alpha_2 & \sin 2\alpha_2\\1 & \cos 2\alpha_3 & \sin 2\alpha_3\end{bmatrix}^{-1}\begin{bmatrix}V_a(\alpha_1)\\V_a(\alpha_2)\\V_a(\alpha_3)\end{bmatrix}$$

and $$C = \pm(A_2^2 + B_2^2 - A_0^2)^{\frac{1}{2}}$$

12. The apparatus of claim 11 where the ambiguous target bearing $\phi$ is calculated by $$\phi = \tfrac{1}{2}\tan^{-1}\left[\frac{[CA_2 + A_oB_2]/(-C^2 - A_o^2)}{[A_oA_2 - CB_2]/(-C^2 - A_o^2)}\right] + 0,180°$$

13. The apparatus of claim 12 wherein the simple loop output signals $V_L(\alpha_1)$ and $V_L(\alpha_2)$ from said simple loop antennas oriented toward $\alpha_1$ and $\alpha_2$ are combined to calculate the azimuth of the simple loop null according to $$\alpha_n = \tan^{-1}\left[\frac{-\sin\alpha_2 V_L(\alpha_1) + \sin\alpha_1 V_L(\alpha_2)}{-\cos\alpha_2 V_L(\alpha_1) + \cos\alpha_1 V_L(\alpha_2)}\right]$$

and $V_L(\alpha) = $ output voltages of a simple loop antenna having its axis perpendicular to azimuth $\alpha$.

14. The apparatus of claim 13 wherein the calculated simple loop null azimuth is used as a basis for identifying and eliminating two of the four ambiguous spaced loop bearings.

15. The apparatus of claim 14 wherein the correct sign of the calculated value of the parameter C is determined as that associated with the two identified simple loop nulls from the spaced loop ambiguous bearings.

16. The apparatus of claim 15 wherein the spaced loop bearing $\phi$ is chosen that is closest to the estimated unambiguous bearing $\phi_e$ as calculated by $$\phi_e = \tan^{-1}\frac{V_1}{V_2}$$

where $$\begin{bmatrix}V_1\\V_2\end{bmatrix} = \frac{j}{D}\begin{bmatrix}(-C\cos\alpha_2 - A_o\sin\alpha_2) & (C\cos\alpha_1 + A_o\sin\alpha_1)\\(C\sin\alpha_2 - A_o\cos\alpha_2) & (-C\sin\alpha_1 + A_o\cos\alpha_1)\end{bmatrix}\begin{bmatrix}V_L(\alpha_1)\\V_L(\alpha_2)\end{bmatrix}$$

and $D = (-C\sin\alpha_1 + A_o\cos\alpha_1)(-C\cos\alpha_2 - A_o\sin\alpha_2)$
$\quad - (-C\cos\alpha_1 - A_o\sin\alpha_1)(-C\sin\alpha_2 + A_o\cos\alpha_2)$ 17. The apparatus of claim 16 wherein the elevation angle of the incident signal is calculated as elevation = $90° - \theta$, and $$\theta = \begin{cases}\sin^{-1}\left(\dfrac{2\sin\phi}{\beta d\, V_1}\right) & \text{if } |V_1| > |V_2|\\[6pt]\sin^{-1}\left(\dfrac{2\cos\phi}{\beta d\, V_2}\right) & \text{if } |V_2| > |V_1|\end{cases}$$

where
  d = distance between loop elements of the spaced loop antenna; and
  $\beta = 2\pi/$(signal wavelength).

18. The apparatus of claim 1 wherein $N(N\geq 3)$ simple loop antenna pairs forming spaced loop antenna output signals are oriented toward azimuths $\alpha_i$, where $\alpha_i$ is given by $$\alpha_i = \frac{i \times 180°}{N} \text{ and } i = 0,1,...N - 1$$

and the Fourier coefficients $A_o$, $A_2$ and $B_2$ and the coefficient C are given by $$A_0 = \frac{1}{N}\sum_{i=0}^{N-1} V_a(\alpha_i)$$

$$A_2 = \frac{2}{N}\sum_{i=0}^{N-1} V_a(\alpha_i)\cos(2\alpha_i)$$

$$B_2 = \frac{2}{N}\sum_{i=0}^{N-1} V_a(\alpha_i)\sin(2\alpha_i)$$

$$C = \pm(A_2^2 + B_2^2 - A_o^2)^{\frac{1}{2}}$$

and $V_a(\alpha) = $ output voltage of said fixed spaced loop antennas at angle given by $\alpha$.

19. The apparatus of claim 18 where the ambiguous target bearing $\phi$ is calculated by $$\phi = \tfrac{1}{2}\tan^{-1}\left[\frac{[CA_2 + A_oB_2]/(-C^2 - A_o^2)}{[A_oA_2 - CB_2]/(-C^2 - A_o^2)}\right] + 0,180°$$

20. The apparatus of claim 19 wherein the output signals from two nonparallel simple loop antennas oriented toward $\alpha_1$ and $\alpha_2$ are combined to calculate the azimuth of the simple loop null according to $$\alpha_n = \tan^{-1}\left[\frac{-\sin\alpha_2 \, V_L(\alpha_1) + \sin\alpha_1 \, V_L(\alpha_2)}{-\cos\alpha_2 \, V_L(\alpha_1) + \cos\alpha_1 \, V_L(\alpha_2)}\right]$$

where $V_L(\alpha)$=output voltages of a simple loop antenna having its axis perpendicular to azimuth $\alpha$.

21. The apparatus of claim 20 wherein the calculated simple loop null azimuth is used as a basis for identifying and eliminating two of the four ambiguous spaced loop bearings.

22. The apparatus of claim 21 wherein the correct sign of the calculated value of the parameter C is determined as that associated with the two identified simple loop nulls from the spaced loop ambiguous bearings.

23. The apparatus of claim 22 wherein the spaced loop bearing $\phi$ is chosen that is closest to the estimated unambiguous bearing $\phi_e$ as calculated by $$\phi_e = \tan^{-1}\frac{V_1}{V_2}$$

where $$\begin{bmatrix} V_1 \\ V_2 \end{bmatrix} = \frac{j}{D}\begin{bmatrix} (-C\cos\alpha_2 - A_o\sin\alpha_2) & (C\cos\alpha_1 + A_o\sin\alpha_1) \\ (C\sin\alpha_2 - A_o\cos\alpha_2) & (-C\sin\alpha_1 + A_o\cos\alpha_1) \end{bmatrix}\begin{bmatrix} V_L(\alpha_1) \\ V_L(\alpha_2) \end{bmatrix}$$

and
$$D = (-C\sin\alpha_1 + A_o\cos\alpha_1)(-C\cos\alpha_2 - A_o\sin\alpha_2)$$
$$- (-C\cos\alpha_1 - A_o\sin\alpha_1)(-C\sin\alpha_2 + A_o\cos\alpha_2)$$

24. The apparatus of claim 23 wherein the elevation angle of the incident signal is calculated as elevation = 90° − $\theta$, and $$\theta = \begin{cases} \sin^{-1}\left(\dfrac{2\sin\phi}{\beta d\, V_1}\right) & \text{if } |V_1| > |V_2| \\ \sin^{-1}\left(\dfrac{2\cos\phi}{\beta d\, V_2}\right) & \text{if } |V_2| > |V_1| \end{cases}$$

where
d=distance between loop elements of the spaced loop antenna; and
$\beta = 2\pi/$(signal wavelength).

25. The apparatus of claim 18 where the ambiguous bearing $\phi$ is calculated as the real value of $\alpha$ necessary to produce minima of $V_a$ according to $$V_a(\alpha) = A_o + A_o \cos 2\alpha + B_2 \sin 2\alpha.$$

26. The apparatus of claim 25 wherein the output signals from two nonparallel simple loop antennas oriented toward $\alpha_1$ and $\alpha_2$ are combined to calculate the azimuth of the simple loop null according to $$\alpha_n = \tan^{-1}\left[\frac{-\sin\alpha_2 \, V_L(\alpha_1) + \sin\alpha_1 \, V_L(\alpha_2)}{-\cos\alpha_2 \, V_L(\alpha_1) + \cos\alpha_1 \, V_L(\alpha_2)}\right]$$

and $V_L(\alpha)$=output voltages of a simple loop antenna having its axis perpendicular to azimuth $\alpha$.

27. The apparatus of claim 26 wherein the calculated simple loop null azimuth is used as a basis for identifying and eliminating two of the four ambiguous spaced loop bearings.

28. The apparatus of claim 27 wherein the correct sign of the calculated value of the parameter C is determined as that associated with the two identified simple loop nulls from the spaced loop ambiguous bearings.

29. The apparatus of claim 28 wherein the spaced loop bearing is chosen that is closest to the estimated unambiguous bearing $\phi_e$ as calculated by $$\phi_e = \tan^{-1}\frac{V_1}{V_2}$$

where $$\begin{bmatrix} V_1 \\ V_2 \end{bmatrix} = \frac{j}{D}\begin{bmatrix} (-C\cos\alpha_2 - A_o\sin\alpha_2) & (C\cos\alpha_1 + A_o\sin\alpha_1) \\ (C\sin\alpha_2 - A_o\cos\alpha_2) & (-C\sin\alpha_1 + A_o\cos\alpha_1) \end{bmatrix}\begin{bmatrix} V_L(\alpha_1) \\ V_L(\alpha_2) \end{bmatrix}$$

and
$$D = (-C\sin\alpha_1 + A_o\cos\alpha_1)(-C\cos\alpha_2 - A_o\sin\alpha_2)$$
$$- (-C\cos\alpha_1 - A_o\sin\alpha_1)(-C\sin\alpha_2 + A_o\cos\alpha_2)$$

30. The apparatus of claim 29 wherein the elevation angle of the incident signal is calculated as elevation = 90° − $\theta$, and $$\theta = \begin{cases} \sin^{-1}\left(\dfrac{2\sin\phi}{\beta d\, V_1}\right) & \text{if } |V_1| > |V_2| \\ \sin^{-1}\left(\dfrac{2\cos\phi}{\beta d\, V_2}\right) & \text{if } |V_2| > |V_1| \end{cases}$$

31. The apparatus of claim 25 wherein said two simple loop antennas are orthogonal and the output signals from said two simple loop antennas are combined to calculate the azimuth of the simple loop null according to $$\alpha_n = \tan^{-1}\left[\frac{V_L(0°)}{-V_L(90°)}\right]$$

32. The apparatus of claim 31 wherein the calculated simple loop null azimuth is used as a basis for eliminating two of the four ambiguous spaced loop bearings formed by said signal processing means.

33. The apparatus of claim 32 wherein the correct sign of the calculated value C is determined as that associated with the two identified simple loop nulls from the spaced loop ambiguous bearings.

34. The apparatus of claim 33 wherein the space loop bearng is chosen that is closest to the estimated unambiguous bearing $\phi_e$ as calculated by $$\phi_e = \tan^{-1}\frac{V_1}{V_2}$$

where $$\begin{bmatrix} V_1 \\ V_2 \end{bmatrix} = \frac{j}{(-A_o^2 - C^2)}\begin{bmatrix} -A_o & C \\ C & A_o \end{bmatrix}\begin{bmatrix} V_L(0) \\ V_L(90) \end{bmatrix}$$

35. The apparatus of claim 34 wherein the elevation angle of the incident signal is calculated as $$\text{elevation} = 90° - \theta, \text{ and}$$

$$\theta = \begin{cases} \sin^{-1}\left(\dfrac{2\sin\phi}{\beta d\, V_1}\right) & \text{if } |V_1| > |V_2| \\ \sin^{-1}\left(\dfrac{2\cos\phi}{\beta d\, V_2}\right) & \text{if } |V_2| > |V_1| \end{cases}$$

36. Antenna apparatus for providing the azimuth bearing of a transmitter where the incident signal from the transmitter has an angle of elevation of between 0 and 90 degrees and where the incident signal includes vertical and horizontal components of any amplitude or phase, the antenna apparatus comprising:

(a) at least two fixed pairs of coaxially aligned simple loop antennas, each pair providing both a simple loop output signal and spaced loop output signal, and wherein each pair of said antennas has nonparallel horizontal axes; and (b) means provided with said antenna output signals for processing their output signals to form a bearing indication of the transmitter.

* * * * *